(12) United States Patent
Olafsson

(10) Patent No.: US 6,504,886 B1
(45) Date of Patent: Jan. 7, 2003

(54) COMMUNICATION OF AN IMPAIRMENT LEARNING SEQUENCE ACCORDING TO AN IMPAIRMENT LEARNING SEQUENCE DESCRIPTOR

(75) Inventor: Sverrir Olafsson, Reykjavik (IS)

(73) Assignee: Conexant Systems Inc., Newport Beach, CA (US)

( * ) Notice: Subject to any disclaimer, the term of this patent is extended or adjusted under 35 U.S.C. 154(b) by 0 days.

(21) Appl. No.: 09/956,207

(22) Filed: Sep. 19, 2001

Related U.S. Application Data

(63) Continuation of application No. 08/969,971, filed on Nov. 13, 1997, now Pat. No. 6,332,009, which is a continuation-in-part of application No. 08/922,851, filed on Sep. 3, 1997, now Pat. No. 6,212,247.

(51) Int. Cl.[7] .................................................. H04L 7/00
(52) U.S. Cl. ........................ 375/368; 375/364; 370/509
(58) Field of Search ................................. 375/358, 221, 375/222, 356, 368, 357, 364; 370/509, 503, 514, 510, 515, 511, 512, 513

(56) References Cited

U.S. PATENT DOCUMENTS

| | | | |
|---|---|---|---|
| 3,534,264 A | | 10/1970 | Blasbalg et al. |
| 4,110,558 A | | 8/1978 | Kageyama et al. |
| 4,411,007 A | | 10/1983 | Rodman et al. |
| 4,445,175 A | | 4/1984 | Cohen |
| 4,841,526 A | | 6/1989 | Wilson et al. |
| 5,003,559 A | | 3/1991 | Kanai et al. |
| 5,077,794 A | | 12/1991 | Taylor |
| 5,117,424 A | * | 5/1992 | Cohen et al. ............... 370/508 |
| 5,228,060 A | | 7/1993 | Uchiyama |
| 5,394,437 A | | 2/1995 | Ayanoglu |
| 5,420,844 A | * | 5/1995 | Kawakubo et al. ........... 369/59 |
| 5,706,284 A | * | 1/1998 | Lee ............................. 370/324 |
| 5,822,328 A | | 10/1998 | Derby et al. |
| 5,825,823 A | | 10/1998 | Goldstein et al. |

FOREIGN PATENT DOCUMENTS

| | | |
|---|---|---|
| EP | 0669740 A2 | 8/1995 |
| WO | WO 96-18261 | 6/1996 |
| WO | WO 98-37657 | 8/1998 |
| WO | WO 98-39866 | 9/1998 |

OTHER PUBLICATIONS

Dagdeverin, Phase 4 Digital Probing Sequence For V.PCM, Aug. 12, 1997.

Eyuboglu, A Possible Digital Line Probing Descriptor Sequence, Aug. 12, 1997.

J. McLaughlin, Multiple Digital Impairment Examination Sequences Descriptor Sequence, Jul. 12, 1997.

Eyuboglu, Adaptive Signal Constellations For PCM Modems, Apr. 9, 1997.

* cited by examiner

*Primary Examiner*—Chi Pham
*Assistant Examiner*—Phuong Phu
(74) *Attorney, Agent, or Firm*—Farjami & Farjami LLP

(57) ABSTRACT

A modem system includes a programmable synchronization signal format that can be configured at a first modem in response to a request received from a second modem. The synchronization signal format may define a number of parameters of the synchronization signal, such as the sign pattern for symbols transmitted by the first modem during a training sequence. The specific parameters of the synchronization signal format may be associated with the design and operation of the second modem. For example, the particular timing recovery and automatic gain control schemes used by the receiver portion of the second modem may be optimally initialized with a synchronization signal having a specific length, amplitude, or spectrum. In one embodiment, a synchronization signal is configured to convey a single frequency tone for use during a synchronization routine. The modem system may also employ similar techniques to generate, transmit, and analyze a programmable line impairment learning signal. Such a programmable learning signal may be formatted such that characteristics of the communication channel are determined for individual signal points. In response to a particular learning signal, the second modem selects a number of preferred signal points for use by the modem system during subsequent data transmission.

24 Claims, 6 Drawing Sheets

COMMUNICATION OF AN IMPAIRMENT LEARNING SEQUENCE ACCORDING TO AN IMPAIRMENT LEARNING SEQUENCE DESCRIPTOR

RELATED APPLICATION

This application is a Continuation of U.S. patent application Ser. No. 08/969,971, entitled Method and Apparatus for Generating a Line Impairment Learning Signal for a Data Communication System, filed Nov. 13, 1997 now U.S. Pat. No. 6,332,009, which is a Continuation-In-Part of U.S. patent application Ser. No. 08/922,851, entitled Method and Apparatus for Generating a Programmable Synchronization Signal for a Data Communication System, filed Sep. 3, 1997, now U.S. Pat. No. 6,212,247.

TECHNICAL FIELD OF THE INVENTION

The present invention relates generally to line probing techniques used in data communication systems, e.g., modem systems, that transmit data between remote locations. More specifically, the present invention relates to the use of a programmable digital impairment learning signal that facilitates the selection of preferred signal points for transmission of data by a data communication system.

BACKGROUND OF THE INVENTION

Digital communication systems, such as modem systems, are well known in the prior art. Such systems may employ various line probing or impairment learning techniques that are utilized to determine the characteristics of the communication channel between a transmit device and a receive device. Line probing signals are usually transmitted near the beginning of a start-up or "handshaking" procedure, during which timing synchronization, equalizer training, and other system initialization techniques may be performed.

The specific impairment learning technique and the particular learning signal or sequence used by a given communication system may depend on the design of the system itself. For example, certain line probing sequences may be more efficiently processed by a given system; the precise format of the line probing signal may vary according to the detection scheme utilized at the receiver, the adaptive equalization structure, the impairment learning methodology, or the like. Although line probing protocols for prior art modems may be governed by internationally recognized operating standards, such protocols do not contemplate the use of a flexible line probing or learning sequence that can vary from application to application.

Unfortunately, such rigidly configured impairment learning signals may not be desirable in the context of a pulse code modulation (PCM) modem system, such as a 56 kbps modem system, which may employ any one of a number of different receiver configurations and which may utilize any one of a number of different digital impairment learning techniques. In addition, the use of a single learning sequence may be undesirable where operating standards for a particular technology have not been established; the use of a flexible line probing sequence ensures that a current system can be suitably reconfigured in accordance with future governing protocols.

Line probing techniques in prior art modem systems endeavor to determine digital impairments of the communication channel and select a particular signal point constellation for use during subsequent data transmission. Such techniques may employ a finite number of sub-constellations based on the $\mu$-law, A-law, or other conventional signal point constellations employed by the particular telecommunication system. Fixed sub-constellations may be suitable for some applications, however they do not always provide the best signal point constellation for the given modem system and the current operating conditions. In addition, such prior art methodologies may analyze channel impairments in response to a probing signal that does not actually contain individual representations of the signal points utilized by the telecommunication system. Such methodologies may estimate the actual channel response to specific signal points rather than directly measure such responses.

Accordingly, the specific receiver design in a PCM modem system may dictate the particular configuration of the digital impairment learning signal used by the system. However, a learning signal that is effective for one PCM receiver may be unsatisfactory for use with another PCM receiver; such compatibility problems may detract from the performance of these PCM systems. In addition, it may be difficult to detect or utilize prior art line probing signals that are governed by current standards and protocols where such line probing signals are not optimized for use with the specific receiver.

SUMMARY OF THE INVENTION

Accordingly, it is an advantage of the present invention that an improved line impairment learning technique is provided in the context of remote data communication systems.

Another advantage is that the present invention provides a data communication system that utilizes a programmable line impairment learning signal that is configured in accordance with the particular receiver design.

A further advantage is that a modem system is provided that includes a transmitter configured to generate a particular learning signal that may be associated with the signal detection scheme utilized by the receiver.

Another advantage is that the present invention provides a receiver modem capable of requesting transmission of a specifically formatted learning signal that may be used to determine impairments of the communication channel.

Another advantage of the present invention is that a PCM modem system may be configured to determine impairments of the communication channel in response to individual signal points and to select a particular constellation of such signal points for use during subsequent data transmission.

The above and other advantages of the present invention may be carried out in one form by a transmit modem for transmitting data over a communication channel to a corresponding receive modem. The transmit modem includes a generator for generating a learning signal in accordance with a learning sequence descriptor. The learning signal contains a number of segments, each being represented by a sequence of symbols. The transmit modem also includes a training symbol assigner configured to assign, in accordance with the leaning sequence descriptor, one of a plurality of training symbols to each of the segments, and a transmitter for transmitting the learning signal over the communication channel to the receive modem.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF PREFERRED EXEMPLARY EMBODIMENTS

Figure 1:
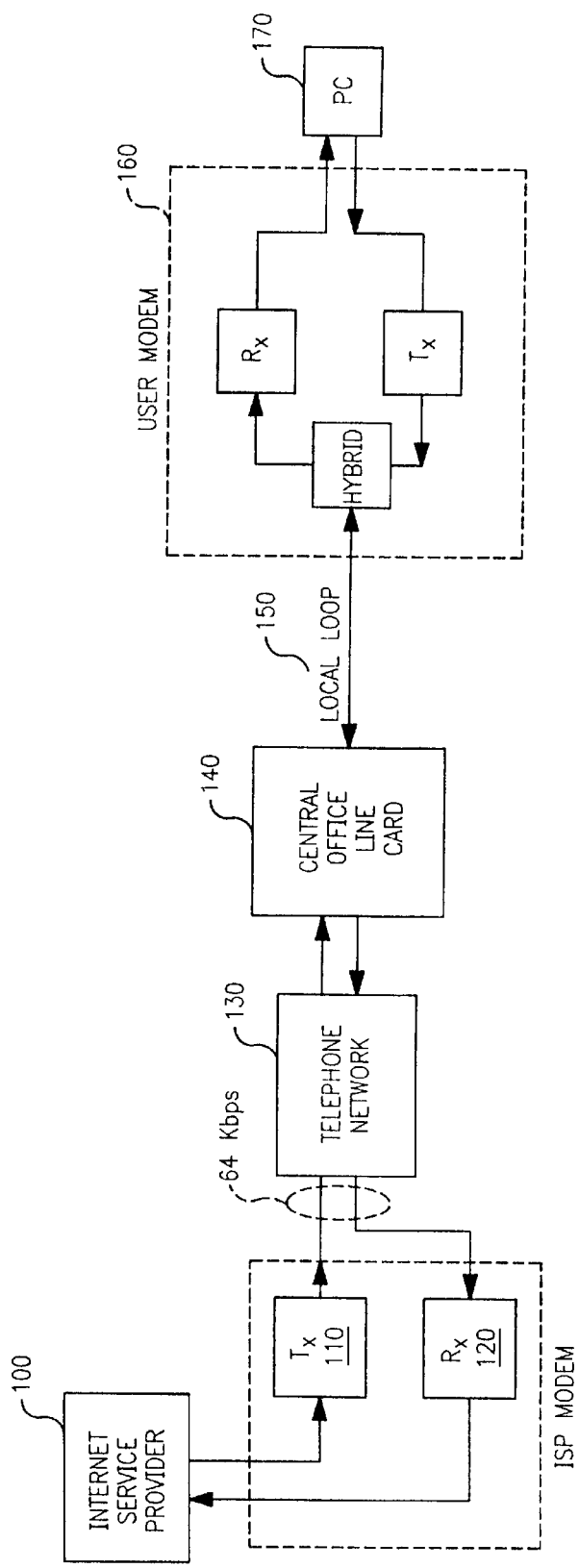
FIG. 1 is a block diagram of an exemplary 56 kbps pulse code modulation (PCM) modem environment.

FIG. 1 shows an exemplary 56 kbps pulse code modulation (PCM) based modem environment in which the present invention may operate. An internet service provider (ISP) or central site 100 is digitally connected to a telephone network 130 through its transmitter 110 and receiver 120. Telephone network 130 is connected to a local loop 150 through a central office line card 140. Line card 140 typically has a PCM codec (not shown) implemented therein. Local loop 150 is connected to a user's personal computer (PC) 170 at the user's site through the user's modem 160. As can be appreciated by those skilled in the art, the connection between the ISP modem transmitter 110 to telephone network 130 is a digital connection with a typical data rate of about 64 Kbps. Since the parameters of telephone network 130 and line card 140 are dictated and set by the telephone company's specifications and operation (and particularly their use of the $\mu$-law signal point constellation), transmitter 110 needs to transmit the digital data in a particular format to fully exploit its digital connection to telephone network 130. Those skilled in the art will appreciate that the system depicted in FIG. 1 may employ any number of known signal processing, coding, and decoding techniques related to, e.g., $\mu$-law signal point constellations, shell mapping, spectral control, equalizer training, and the like. For the sake of brevity, such known techniques and systems are not described in detail herein. It should also be noted that the principles of the present invention are not limited to modem applications and that the present invention may be suitably modified or configured for deployment in any number of data communication systems.

Generally, the typical PCM modem system formats digital data for transmission from transmitter 110 to user modem 160, where the digital data is retrieved for use by PC 170. The data may be arranged into data symbols and encoded via any number of techniques such as $\mu$-law mapping. The data symbols may then be further processed with spectral control or other signal conditioning schemes prior to being transmitted at a particular symbol rate to telephone network 130. User modem 160 eventually receives the data symbols and thereafter decodes the data to obtain the original digital data. To function efficiently, user modem 160 should be synchronized with the ISP modem. Consequently, user modem 160 may include a timing recovery scheme that recovers the transmitted symbol rate and synchronizes the receiver at user modem 160 with transmitter 110.

Figure 2:
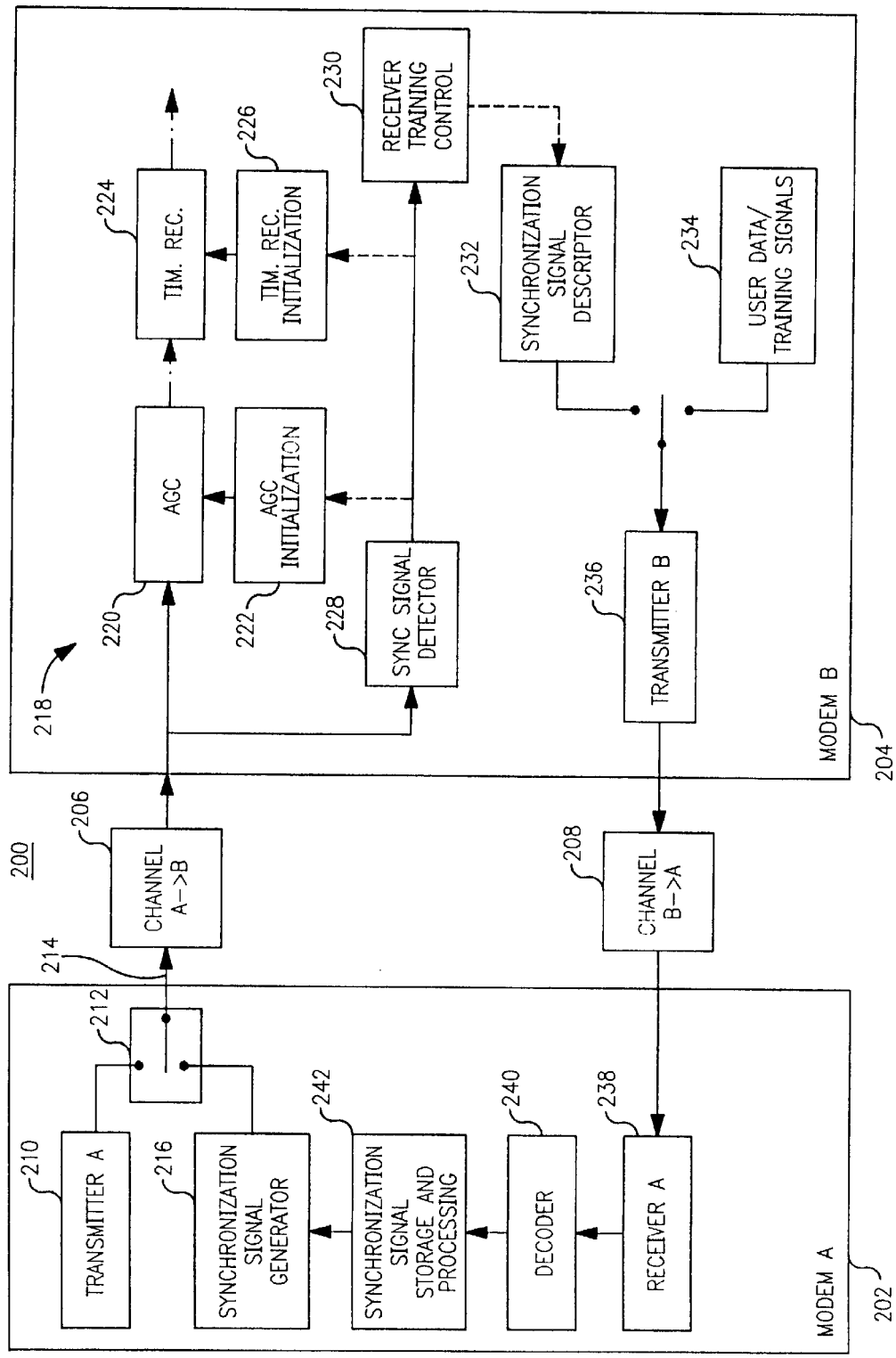
FIG. 2 is a block diagram of an exemplary modem system in which a programmable synchronization signal technique may be incorporated.

FIG. 2 is a block diagram of a preferred exemplary modem system 200 that incorporates the synchronization features of the present invention; it will be appreciated, however, that the present invention can be implemented in the context of any number of different synchronization, timing recovery, and other signal processing techniques known in the art. For example, many suitable techniques are described in Lee & Messerschmitt, DIGITAL COMMUNICATION (2d ed. 1996), which is incorporated herein by reference. Accordingly, the particular implementations shown and described herein are merely exemplary and are not intended to limit the scope of the present invention in any way. Indeed, for the sake of brevity, the particular timing recovery, automatic gain control (AGC), synchronization, training techniques, and other functional aspects of the system shown in FIG. 2 need not be described in detail herein.

Generally, modem system 200 includes a first modem, e.g., modem 202, and a second modem, e.g., modem 204. Modems 202, 204 are generally configured in accordance with known principles to communicate over at least two channels, e.g., channels 206, 208. In the context of current 56 kbps modems, channel 206 may be considered to be a digital channel and channel 208 may be considered to be an analog or partially analog channel. It should be appreciated that, although not shown in FIG. 2, modem system 200 may include a number of additional hardware and software components. In addition, the various individual elements of modem system 200 may be realized by any number of discrete semiconductor chips, memory elements, and/or processing elements, and that the various processes described herein may be controlled by software instructions carried out by a suitable microprocessor.

Modem 202 includes a transmitter 210, which is configured to transmit encoded data symbols in accordance with general PCM techniques. Transmitter 210 may cooperate with a polarity/amplitude block 212 to produce an output 214 that contains synchronization-conveying data symbols. Polarity/amplitude block 212 functions to configure encoded data symbols in accordance with a synchronization signal format associated with modem 204 (described in more detail below). Polarity/amplitude block 212 may suitably include a polarity assigner that assigns a positive or a negative polarity to data symbols. The polarity assigner may employ digital techniques such that, for example, a "0" bit received from a synchronization signal generator 216 results in a positive output symbol and a "1" bit received from synchronization signal generator 216 results in a negative output symbol. Of course, any suitable digital or analog control scheme may be employed by synchronization signal generator 216 or the polarity assigner. A polarity assigner may be an effective functional component in modem systems that employ fixed or predetermined transmit amplitudes. For example, many modem systems utilize two specific levels (positive and negative) for purposes of synchronization and receiver training. Accordingly, a synchronization signal that assumes the two transmit amplitudes may be defined in part by a simple sign pattern.

In addition to, or in lieu of, the polarity assigner, polarity/amplitude block 212 may include a suitable amplitude assigner that assigns a particular amplitude to the current data symbol. Such an amplitude assigner may be desirable to enable modem system 200 to employ variable transmit levels during training or synchronization intervals or to enable modem 204 to request that particular transmit levels be used during training or synchronization processes. As with the polarity assigner described above, the amplitude assigner may utilize any number of techniques to produce a suitable signal output. For example, amplitude assigner may define a particular μ-law code for each amplitude level; transmission of the two μ-law codes may thereafter be switched according to a specific amplitude pattern (which may be controlled or generated by synchronization signal generator 216). For example, a "0" bit received by the amplitude assigner may cause the current data symbol to be transmitted at a first μ-law level, while a "1" bit received by the amplitude assigner may cause the current data symbol to be transmitted at a second μ-law level different than the first μ-law level. Of course, the specific amplitudes may vary according to the given application, and different polarities may be assigned to the particular codes.

It should be appreciated that modem system 200 may employ alternate techniques for producing the synchronization signal. For example, rather than utilize polarity/amplitude assigner 212 as described above, modem 202 may include a switch that controls whether the output from transmitter 210 or the output from synchronization signal generator 216 is transmitted to modem 204. Such a configuration may be desirable in a modem system that utilizes a coding scheme that does not lend itself to the generation of synchronization-conveying data symbols. In such a system, the switch may cause a devoted synchronization signal generated by synchronization signal generator 216 to be transmitted to modem 204 during a synchronization or resynchronization procedure. Conversely, during periods of data transmission, the switch is preferably set such that the output from transmitter 210 is directed over channel 206. Those skilled in the art will appreciate that the present invention is not limited to any specific synchronization signal transmission technique and that alternate techniques may be employed to accomplish equivalent results.

Although not a requirement of the present invention, output signal 214 preferably conveys the encoded information bits in data symbols that are arranged such that they concurrently convey synchronization or timing information to modem 204. Accordingly, the combination of, inter alia, transmitter 210, polarity/amplitude block 212, and synchronization signal generator 216 may be functionally equivalent to a "transmitter" that transmits a synchronization signal from modem 202 to modem 204. Synchronization-conveying data symbols may be transmitted during an initialization or synchronization procedure or periodically during a resynchronization period performed during a given data transmission session. It should be appreciated that the techniques described herein may be equivalently applied to a system that utilizes a synchronization signal that is transmitted independently from the data symbols.

With continued reference to FIG. 2, output signal 214 is suitably transmitted over channel 206 to modem 204 in accordance with conventional techniques. Modem 204 includes a receiver 218 configured to receive signals transmitted by modem 202; modem 204 processes such signals to obtain the original digital data encoded by modem 202. It should be noted that receiver 218 may include any number of additional components (that may be known in the art) for decoding, equalization, conditioning, or other processing of the received signal. Receiver 218 preferably includes an AGC circuit 220, which may include an AGC initialization circuit 222, and a timing recovery circuit 224, which may include a timing recovery initialization circuit 226. Circuits 220, 222, 224, and 226 may be configured in accordance with any number of known techniques and may employ a variety of suitable signal processing techniques. For purposes of the present invention, timing recovery circuit 224 may be configured such that a number of processing parameters are dependent upon the transmit rate of symbols received from modem 202. It should be noted that the present invention may be applicable to other adaptive processing schemes utilized by receiver 218 or any "trainable" components employed by modem 204.

Modem 204 preferably includes a synchronization signal detector 228 which communicates with AGC initialization circuit 222 and with timing recovery initialization circuit 226. Synchronization signal detector 228 is configured to detect the presence of the synchronization signal within the synchronization-conveying data symbols transmitted by modem 202. Synchronization signal detector 228 may employ any suitable sign (polarity), amplitude, and/or other convenient detection schemes, such as conventional filtering or conditioning techniques. In the exemplary embodiment shown in FIG. 2, the detection of the synchronization signal may cause AGC initialization circuit 222 or timing recovery initialization circuit 226 to respectively initialize AGC circuit 220 or timing recovery circuit 224. Synchronization signal detector 228 (or other processing elements of modem 204) may also be configured to obtain synchronization or timing information used by AGC initialization circuit 222 or timing recovery initialization circuit 226.

Synchronization signal detector 228 may also be configured to process the synchronization signal to obtain timing or synchronization information therefrom, e.g., one or more timing markers. It should be appreciated that circuits 220, 222, 224, and 226 need not directly receive or process the actual synchronization signal or the data symbols conveying the synchronization signal; rather, circuits 220, 222, 224, and 226 may utilize timing markers obtained from the synchronization signal for use during initialization and training. Accordingly, a receiver training control block 230 may be utilized to initiate and regulate training or resynchronization processes within modem 204 or to control parameters associated with a synchronization signal format compatible with receiver 218.

Modem 204 is preferably capable of requesting a particular synchronization signal format with which it is compatible. As discussed briefly above, receiver 218 may be designed such that trainable components, e.g., AGC circuit 220 or timing recovery circuit 224, are optimally initialized with a synchronization signal having a particular format. For purposes of this description, "synchronization signal format" means any characteristic of the synchronization signal that may affect the nature or quality of the training performed by modem 204. For example, the synchronization signal format may include, inter alia, one or more of the following parameters:—a number of amplitude levels used for the synchronization signal; an amplitude range for the synchronization signal symbols; a desired sign pattern associated with symbols or data transmitted in accordance with the synchronization signal; a desired amplitude pattern associated with symbols or data transmitted in accordance with the synchronization signal; a preferred spectral content for the synchronization signal; a period or length of the synchronization signal; a repetition factor associated with periodic synchronization signals; and whether (and to what extent) inverse synchronization signals are employed.

In a preferred exemplary embodiment, a synchronization signal descriptor stored at modem 204 contains a synchronization signal format compatible with receiver 218. Moreover, modem 204 may include any number of suitable synchronization signal descriptors for use in any number of specific operating conditions and that the present invention is not limited to any given synchronization signal format, whether or not described in detail herein. Modem 204 may incorporate a memory element 232 that stores at least one synchronization signal descriptor associated with receiver 218. In other words, the synchronization signal descriptor may be dependent upon particular design parameters of receiver 218, e.g., the scheme employed by timing recovery circuit 224 or the scheme employed by AGC circuit 220. For example, the particular timing recovery scheme may be best initialized with a simple and easy-to-detect synchronization signal, such as a short tone. Alternately, the specific timing recovery scheme may be designed such that a spectrally rich and relatively complex synchronization signal produces the best results during training. Furthermore, different AGC strategies may suggest different synchronization signal formats. It should be noted that the synchronization signals need not be utilized directly by the associated circuits and processing schemes used by receiver 218.

In accordance with one aspect of the present invention, modem system 200 is configured to employ a synchronization signal that conveys a single frequency tone (which may be combined with a single frequency band-edge tone). In an exemplary embodiment, modem system 200 is configured such that a two-stage synchronization signal is generated and transmitted by modem 202. The two-stage synchronization signal preferably includes a preliminary segment that includes a simple symbol pattern that conveys a single frequency tone, followed by a secondary segment that may be more spectrally complex to enable effective ongoing synchronization. In a typical PCM data communication system such as a PCM modem, each of the synchronization symbols are taken from the signal point constellation employed by the communication system, e.g., the $\mu$-law constellation.

Using a single tone as a synchronization signal for a PCM modem system has several advantages. For example, a simple tone is easy to detect, and pre-existing modems may already implement several types of tone detectors for other purposes; such tone detectors may be leveraged for use in detecting a single tone synchronization signal. In addition, timing information is easily extracted from a tone by measuring the phase associated with the received signal. A tone also has the advantage of having substantially stable characteristics when transmitted over channels exhibiting amplitude distortion; only the amplitude and phase will change. In contrast, multi-frequency synchronization signals will change because the relative amplitude levels associated with the different frequencies vary on channels having amplitude distortion. Another advantage is that single frequency interference is easily dealt with when detecting a tone, however it can cause difficulty when detecting more complex signals.

A single tone synchronization signal can be easily generated by modem 202, such a synchronization signal can be configured such that digital impairments have a minimal effect on the quality of the synchronization routine performed by modem system 200. For example, a 2 kHz tone may be generated with a single amplitude and alternating signs every other symbol, e.g., the preliminary synchronization signal segment may contain a repetitive sequence of four symbols defined by the symbol pattern +A, +A, −A, −A, where A represents the amplitude of one symbol contained in the signal point constellation used by modem system 200. This signal will be substantially immune to the effects of digital pads. Those skilled in the art will appreciate that a PCM modem system using robbed bit signaling (RBS) may create tones having frequencies of 1.333 kHz, 2.667 kHz, and/or 4.000 kHz; these additional tones may be received at the receiving modem along with the single frequency synchronization tone. An alternate repetitive sequence that may be used to convey a single 2 kHz tone is defined by the pattern +A, B, −A, B, where A represents the amplitude of one symbol and B represents an amplitude that is substantially equal to zero. Those skilled in the art will recognize that B may represent a zero signal point or the signal point closest to zero in the particular constellation.

Another exemplary pattern that may be used in the preliminary segment contains six symbols defined by the pattern +A, +A, +A, −A, −A, −A. Such a preliminary synchronization signal conveys a 1.333 kHz tone with a band-edge tone of 4 kHz. This signal will also be substantially immune to digital pads. If a 2 kHz tone is desired with a band-edge tone at 4 kHz, then a periodic pattern having two levels may be utilized, e.g., +A, +C, −C, −A, where A represents the amplitude of one symbol, C represents the amplitude of a different symbol, and C≈3A. Other symbol patterns may be employed to suitably convey either a single frequency tone or a single frequency tone combined with a single frequency band-edge tone. The particular single frequencies transmitted may vary from system to system.

Figure 7:
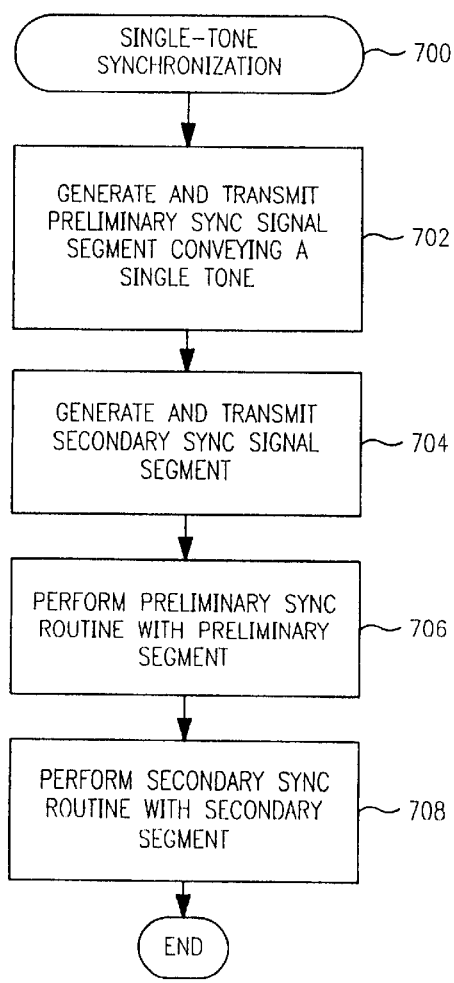
FIG. 7 is a flow diagram of a single-tone synchronization process that may be performed by a PCM modem system.

FIG. 7 depicts a flow diagram of a single-tone synchronization process 700 that may be performed by modem system 200 during a start-up period. Although process 700 is shown and described in the context of a multiple-stage synchronization protocol, modem system 200 may alternately utilize a single-stage synchronization protocol that only employs the single frequency synchronization signal described above. Process 700 may begin with a task 702, which causes modem 202 to suitably generate and transmit a preliminary synchronization signal segment to modem 204. As described in further detail herein, modem 202 may employ any number of conventional signal processing, memory, and data formatting techniques to generate, encode, and transmit the preliminary synchronization signal in accordance with the present invention. As described above, the preliminary synchronization signal preferably contains a repetitive sequence of symbols associated with the particular signal point constellation employed by modem system 200.

The preliminary synchronization signal may convey a single frequency tone or, alternatively, a single frequency tone combined with a single frequency band-edge tone different than the single frequency tone.

A task 704 may be performed to cause modem 202 to subsequently generate and transmit a secondary synchronization signal segment to modem 204. It should be appreciated that task 704 is optional, i.e., modem system 200 need not employ a secondary synchronization signal. In the preferred embodiment, the secondary synchronization signal segment immediately follows the preliminary synchronization signal segment. The secondary synchronization signal segment may be more complex in nature, e.g., conveying more than a single frequency tone, to enable modem 204 to perform ongoing synchronization after the preliminary synchronization signal segment is 10 processed to initialize modem 204. In practice, tasks 702 and 704 are performed in a combined manner to enable modem system 200 to process a single synchronization signal.

A task 706 preferably causes modem 204 to perform a preliminary synchronization routine in response to the initial synchronization signal segment. Modem 204 may employ conventional or other processing techniques to receive and process the single frequency tone (with or without a corresponding band-edge tone) and to suitably synchronize receiver 218 with modem 202. The length and configuration of the preliminary synchronization signal segment is preferably selected to enable modem 204 to quickly and easily initialize. Following task 706, a task 708 may be performed to cause modem 204 to perform a secondary synchronization routine in response to the secondary synchronization signal segment. Modem system 200 may only utilize the single frequency synchronization techniques described herein; thus, task 708 is optional. Task 708 may also employ any number of conventional or other techniques to enable modem 204 to effectively synchronize itself to modem 204. In this manner, process 700 exploits the respective advantages of a simple, single tone synchronization signal and a complex, multi-frequency synchronization signal.

Referring back to FIG. 2, the specific synchronization signal descriptor may be realized in any suitable form capable of transmission from modem 204 to modem 202. For example, the descriptor may be formatted as digital information and transmitted in accordance with known signaling or training protocols. Such information is thus indicative of the synchronization signal descriptor. Modem 204 may incorporate transmission of such information with the transmission of conventional user data and training signals (indicated by reference number 234). Accordingly, a transmitter 236 is preferably configured to transmit the descriptor information to modem 202. Modem 204 may cause transmitter 236 to transmit the synchronization signal descriptor information automatically during an early portion of a start-up sequence, in response to any number of conventional signaling packets transmitted during an initialization procedure, or in response to a synchronization request transmitted by modem 202. As with other conventional training or signaling data, such a request may be included in the initial training sequence, e.g., at the beginning of a conventional handshaking procedure.

The information containing the synchronization signal descriptor is preferably transmitted through channel 208 in a conventional manner and eventually received by a receiver 238 located at modem 202. Of course, modem 202 may employ any suitable alternative device or technique for receiving the synchronization signal format from modem 204. A decoder 240 may be used to decode any signals transmitted by modem 204 to modem 202, including the signal that conveys the synchronization signal descriptor.

Modem 202 may also include a synchronization signal storage/processing block 242 that communicates with synchronization signal generator 216. Synchronization signal storage/processing block 242 is preferably configured to process the synchronization signal descriptor and to provide suitable data to synchronization signal generator 216 such that an appropriate synchronization signal is formatted. As described more fully below, synchronization signal storage/processing block 242 may be capable of storing any number of synchronization signal format parameters that are known by both modem 202 and modem 204. Use of such predetermined parameters may be desirable to reduce the amount of information necessary to define a given synchronization signal favored by modem 204.

Although the synchronization signal descriptor may contain any suitable formatting data, the preferred exemplary embodiment assumes that the initial training signal will use a two-level signal, i.e., two levels of equal amplitude but of opposing sign. The specific levels utilized may be predetermined or specified in the synchronization signal descriptor. Consequently, a unique synchronization signal may be specified by modem 204 by indicating a pattern of sign variations. Furthermore, if the synchronization signal pattern is assumed to include a number of periodic sub-patterns, then a unique signal can be specified with less information by indicating a period, the sign pattern within each period, and a number of repetitions of the period. Accordingly, a flexible manner of specifying a synchronization signal may use the following parameters:

P—the period of the sub-pattern;

SP—the sign pattern within the sub-pattern; and

N—the number of repetitions of the sub-pattern.

Although the type of synchronization signal typically does not affect the performance of transmitter 210, it may be desirable to shape the spectrum of the synchronization signal to avoid possible problems with transformer hybrids employed by modem system 200. For example, it may be preferable to restrict the possible synchronization signal sign patterns to those with little or no DC content, e.g., sign patterns having an equal number of positive and negative symbols. In addition, a given sub-pattern may be formed from a series of similar sequences, thus giving rise to less spectral content than a sub-pattern formed from a single, non-repeating sequence. Those skilled in the art should appreciate that the ranges of P and N may be suitably selected in accordance with the particular data communication environment or specific functional components within the operating environment. In one preferred exemplary embodiment, the value of P is within the range of 16 to 32 and the value of N is within the range of 8 to 16.

To enable the communication of symbol position information, the synchronization signal can be augmented with an inverse synchronization signal corresponding to at least a portion of the synchronization signal or associated with the particular sub-pattern. Such an inverse signal may follow one or more repetitions of the synchronization signal (which may be related to any number of sign sub-patterns). For example, N periods of the sub-pattern may be repeated, followed by P symbols transmitted with the opposite signs of that specified in SP. In accordance with this technique, the symbol position appears as a phase reversal of the synchronization pattern. The descriptor contents for two exemplary synchronization signals are set forth below.

EXAMPLE 1

Four (4) symbol sub-sub-pattern, equivalent to a 2 kHz tone; 128 total symbols followed by 16 symbols of inverse polarity:

P=16

SP=0110 0110 0110 0110

N=8

EXAMPLE 2

Twenty-four (24) symbol pattern, rich spectral content; 240 total symbols followed by 24 symbols of inverse polarity:

P=24

SP=0000 1000 0101 1110 1010 1111

N=10

As described briefly above, modem system 200 may be alternately configured such that an amplitude pattern is used in addition to (or instead of) a sign pattern. Furthermore, the synchronization signal descriptor may specify the particular amplitude levels with which modem 202 should transmit the synchronization-conveying and other data symbols. Thus, in addition to conveying a sign pattern, the synchronization signal descriptor may convey an amplitude pattern. Those skilled in the art will recognize that sign patterns and amplitude patterns may both be realized as a sequence of digital bits within the synchronization signal descriptor; synchronization signal storage/processing block 242 and synchronization signal generator 216 may simply interpret and process the sequence in a different manner. Synchronization signal detector 228 is suitably configured to receive and detect any polarity (and/or amplitude) changes in the stream of received symbols and to convey the timing data to AGC initialization circuit 222 or timing recovery circuit 226. As described briefly above, synchronization signal detector 228 may be realized with any number of known processing components, e.g., bandpass (or other) filters or correlation detectors.

To decrease the amount of information needed to specify a synchronization signal, one or more of the above parameters (including an amplitude pattern) can be fixed at both modem 202 and modem 204. For example, the parameter P could be fixed to any suitable number, e.g., 12, which allows for sub-patterns of periods 2, 3, 4, 6, or 12. Consequently, only the 12-symbol sign pattern SP and the number of repetitions N would need to be transmitted by modem 204. Of course, the parameter N could also be predetermined, e.g., N=16, which would call for a length of 192 symbols. It should be appreciated that, although possible to fix the sign pattern SP, the benefits of the present invention are best realized when the sign pattern optimized for receiver 218 is initially unknown to modem 202.

Figure 3:
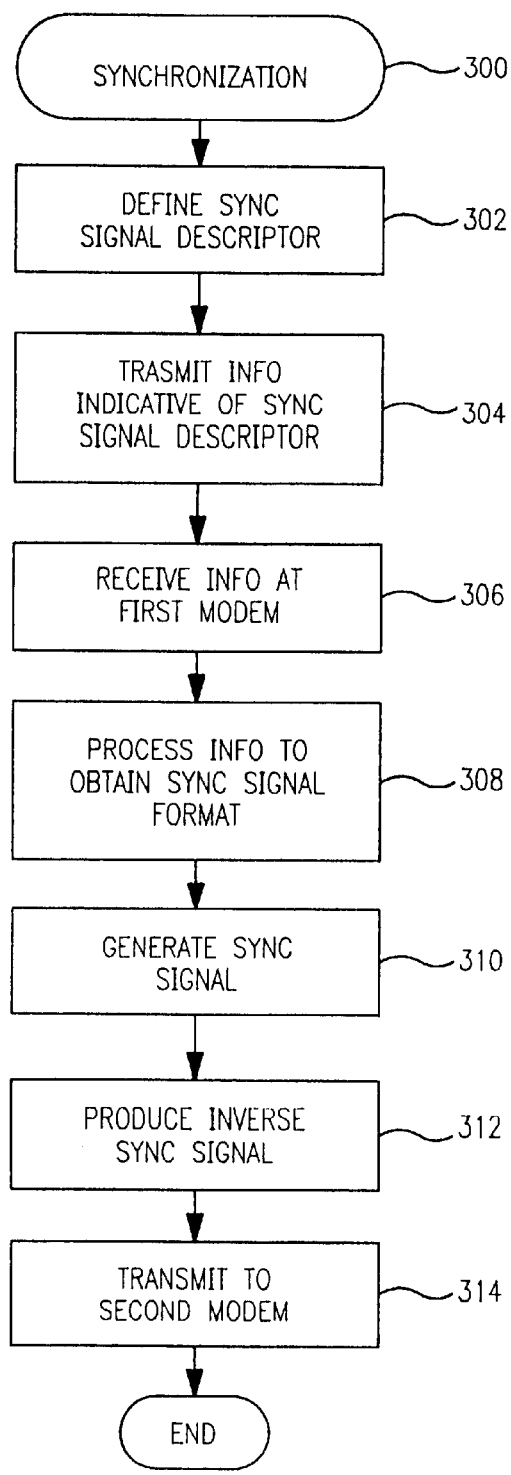
FIG. 3 is a flow diagram of a synchronization process that may be carried out by the modem system shown in FIG. 1.

Referring now to FIG. 3, an exemplary synchronization process 300 may be performed by modem system 200. It should be noted that the majority of synchronization process 300 may be performed during a training procedure associated with modem system 200 or during a periodic resynchronization procedure performed during an established transmission session between modems 202, 204. Process 300 may be performed in conjunction with any number of conventional data communication processes, and additional or alternative processing techniques may be suitably employed in a practical implementation. Furthermore, process 300 may be controlled by software instructions carried out by any number of microprocessors employed by modem system 200. The function of such processing and control systems are known to those skilled in the art and, therefore, are not described in detail herein.

Synchronization process 300 preferably begins with a task 302, which defines at least one synchronization signal descriptor (described above) associated with receiver 218 (see FIG. 2). Task 302 may be carried out automatically by modem 204 or in response to a remote programming routine configured to load the appropriate information into memory element 232. Alternatively, task 302 may be performed by memory element 232 and a corresponding processor element (not shown) of modem 204; in practice, the synchronization signal descriptor may be defined by digital data stored in memory element 232. Task 302 preferably defines at least one of: (1) a sign pattern (and/or an amplitude pattern) associated with a synchronization signal transmitted by modem 202; (2) a period associated with the synchronization signal; and (3) a number of repetitions of the synchronization signal to be transmitted by modem 202. These parameters are all described in detail above.

Following task 302, a task 304 causes modem 204 to transmit information indicative of a particular synchronization signal descriptor to modem 202. As described above, task 304 may be performed by transmitter 236. Eventually, a task 306 is performed to receive the transmitted information at modem 202. Receiver 238 may be utilized to accomplish task 306. Following task 306, a task 308 may be performed to process the received information and to extract the synchronization signal descriptor therefrom. Task 308 may employ any number of conventional signal processing techniques known to those skilled in the art.

After a sufficient amount of the synchronization signal descriptor is obtained at modem 202, a task 310 is preformed to suitably generate a synchronization signal for transmission to modem 204. As described above, the synchronization signal is preferably configured in accordance with the synchronization signal descriptor. The synchronization signal may be generated by synchronization signal generator 216 and polarity/amplitude block 212.

In addition to task 310, a task 312 may be performed to produce an inverse synchronization signal corresponding to at least a portion of the synchronization signal. As described above, the inverse synchronization signal may be generated by reversing the polarity of the received sign pattern (or, alternatively, by reversing the amplitude assignment set forth in the received amplitude pattern). Following task 312, a specific synchronization signal, which is especially compatible with modem 204, is known at modem 202. This synchronization signal preferably includes a number of repetitions of a particular sign or amplitude sub-pattern followed by at least one iteration of an inverse to the sub-pattern.

A task 314 is performed to transmit the desired synchronization signal from modem 202 to modem 204, where it is received, processed, and utilized by modem 204 to obtain timing markers used by various components of receiver 218. Although this description refers to the transmission and processing of a synchronization signal, it should be appreciated that a practical implementation of the present invention utilizes the synchronization signal to format data symbols such that synchronization or timing information may be "embedded" within synchronization-conveying symbols contained in output 214. Following task 314, synchronization process 300 ends.

The programmable aspects of modem system 200 may also be applied to digital (and other) impairment learning techniques. Briefly, impairment learning may be performed during a start-up procedure associated with modem system 200 to determine the characteristics of, e.g., channel 206 between modem 202 and modem 204. In the context of a 56 kbps modem system, the impairment learning technique analyzes digital impairments associated with channel 206 such that modem system 200 can perform subsequent data transmission in an efficient and effective manner. General line probing techniques are known to those skilled in the art and will not be described in detail herein.

Figure 4:
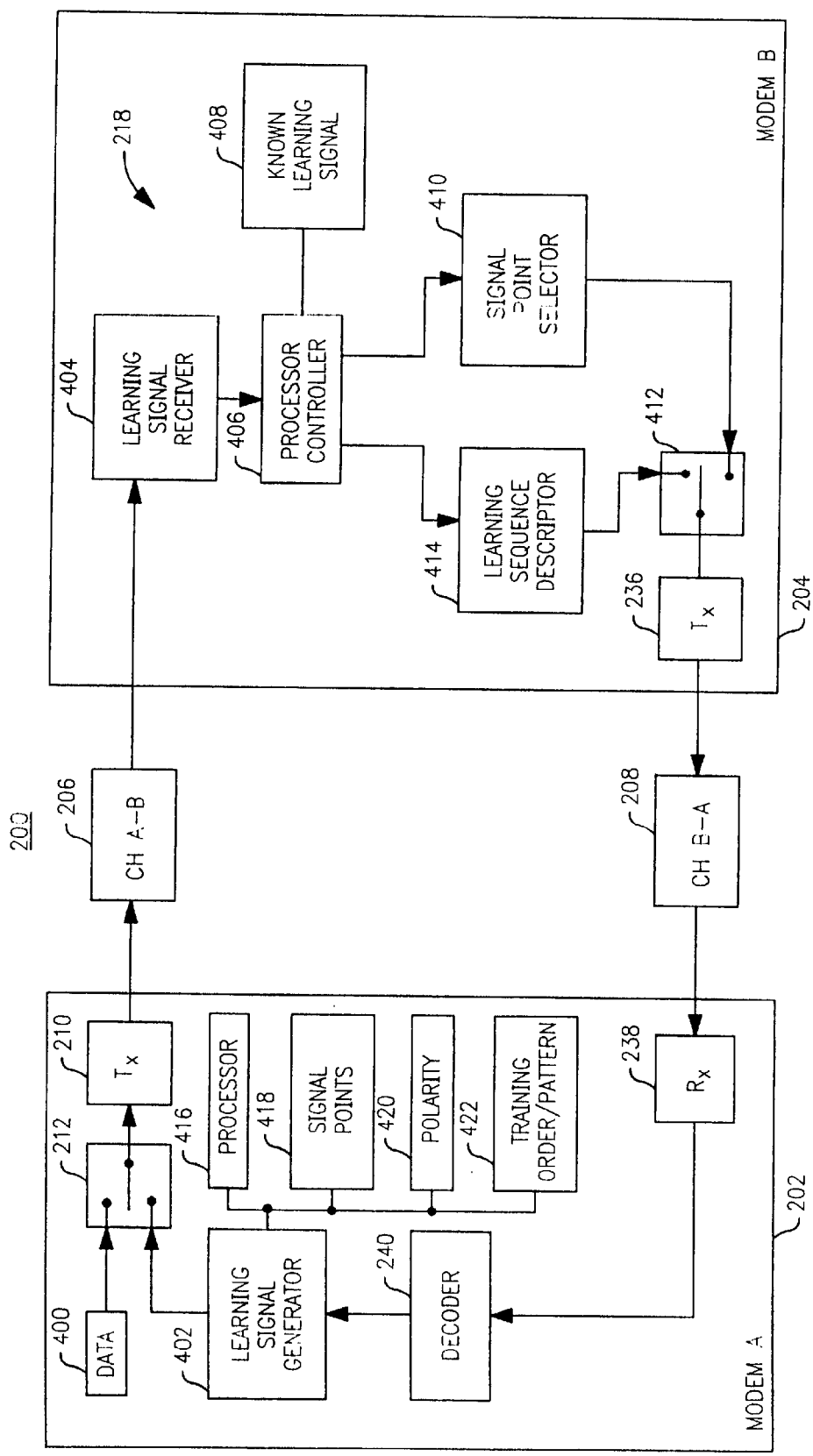
FIG. 4 is a block diagram of an exemplary modem system in which a programmable line impairment learning signal technique may be incorporated.

FIG. 4 illustrates modem system 200 configured in accordance with the preferred line impairment learning techniques of the present invention. For the sake of clarity and brevity, conventional elements and known functional components are not shown in FIG. 4 or described herein. Several elements shown in FIG. 4 are the similar or identical to those described above in connection with FIG. 2.

Transmitter 210 may be configured to transmit encoded data from, e.g., a data source 400 during a data transmission mode. Element 212 may suitably serve as a switch to enable modem 202 to alternate between the data mode and a line impairment learning mode. As shown in FIG. 4, element 212 may be suitably controlled to direct the output from a learning signal generator 402 to transmitter 210 such that a specified learning signal having a particular format known by modem 204 is transmitted from modem 202 to modem 204. As described in more detail below, learning signal generator 402 may utilize any number of techniques, including table look-ups, ROM access, digital signal processing, or the like, to generate the particular learning signal.

During the particular line impairment learning period, the learning signal is suitably transmitted over channel 206 to modem 204. Modem 204 preferably includes a learning signal receiver 404 (which may be incorporated into receiver 218) configured to detect the presence of the incoming learning signal transmitted by modem 202. Receiver 404 may employ any suitable polarity, amplitude, and/or other detection schemes, such as conventional filtering or conditioning techniques. Alternatively, receiver 404 may respond to the end of a previously transmitted control signal by recognizing that a learning signal will be the next signal received. In the exemplary embodiment shown in FIG. 4, the reception of the learning signal may cause a processor/controller 406 to initialize an appropriate line impairment analysis. Processor/controller 406 may utilize any number of conventional techniques to suitably analyze the received learning signal with respect to a predetermined or known learning signal 408. Known learning signal 408 may be stored in a suitable memory element in response to a prior learning signal formatting routine (described below) performed by modem 204.

In the preferred embodiment, processor/controller 406 compares the received learning signal with the known learning signal to obtain data associated with characteristics of channel 206. In an exemplary 56 kbps modem environment, digital impairments of channel 206 are determined by analyzing the differences between the symbols received by modem 204 and the "ideal" symbols known by modem 204.

The data obtained by the above analysis is preferably utilized by modem 204 to select a group of signal points that are suitable for use by modem system 200 during subsequent data transmission. Those skilled in the art will appreciate that any number of techniques may be employed to carry out this selection. For example, the present invention may find a set of signal points having a particular minimum distance maintained between points as they are estimated within the receiver. In a preferred embodiment, processor/controller 406 is configured to determine a plurality of preferred data points on a point-by-point basis, where such preferred data points are taken from the signal point constellation (e.g., the $\mu$-law or the A-law constellation) used by the telecommunication system with which modem system 200 operates. In the context of this description, a "point-by-point" determination means that processor/controller 406 analyzes the line impairments for individual signal points one at a time rather than, for example, a group of signal points, a spectrum of frequencies, or signals otherwise related to more than one transmitted learning point. Modem 204 preferably includes a signal point selector 410 configured to select a number of signal points suitable for subsequent data transmission.

Signal point selector 410 may also be configured to operate on a point-by-point basis to provide a "custom" set of signal points that best compensates for the digital impairments of channel 206. Thus, modem 204 is preferably capable of designating individual points within a subset of the signal point constellation rather than merely selecting from among a discrete group of predetermined subsets. Once a particular subset of signal points is determined for a current communication session, an output from signal point selector 410 may be routed through a switching block 412 to transmitter 236 for transmission to modem 202. In this manner, modem 202 may be informed of the signal points preferred by modem 204 for the subsequent transmission of data.

In the preferred embodiment, a learning sequence descriptor stored at modem 204 contains a learning signal format that is compatible with receiver 218 and/or the particular line impairment learning techniques utilized by modem 204. Moreover, modem 204 may include any number of suitable learning sequence descriptors for use in any number of specific operating conditions and the present invention is not limited to any given learning signal format, whether or not described in detail herein. Modem 204 may incorporate a memory element 414 configured to store at least one learning sequence descriptor associated with modem 204. In other words, the learning sequence descriptor may be dependent upon particular design parameters of modem 204, e.g., the equalization structure employed by receiver 218. It should be noted that the particular learning signals need not be utilized directly by the associated circuits and processing schemes used by modem 204.

The specific learning sequence descriptor may be realized in any suitable form capable of transmission from modem 204 to modem 202. The transmission of the learning sequence descriptor is similar to the transmission of the synchronization signal descriptor described above in connection with FIG. 2. Accordingly, transmitter 236 may be further configured to suitably transmit the learning sequence descriptor to modem 202 during an early portion of a start-up sequence, in response to any number of conventional signaling packets transmitted during an initialization procedure, or in response to a synchronization request transmitted by modem 202. The information containing the learning sequence descriptor is preferably transmitted to modem 202, received by modem 202, and decoded in a similar manner to that described above in connection with the synchronization signal descriptor.

As described briefly above, modem 202 may also include learning signal generator 402, which is preferably configured to generate a suitable learning signal in accordance with the received learning sequence descriptor. Learning signal generator 402 may cooperate with a processor 416 that processes the learning sequence descriptor to thereby provide suitable data to learning signal generator 402 such that an appropriate learning signal is formatted. As described in more detail below, learning signal generator 402 may be configured to access any number of stored learning signal format parameters that are known by both modem 202 and modem 204. Use of such predetermined parameters may be desirable to reduce the amount of information necessary to define a given learning signal favored by modem 204.

Although the learning sequence descriptor may contain any suitable formatting data, the preferred exemplary embodiment assumes that the learning signal will be divided into a number of multi-symbol segments. Each segment preferably is a sub-sequence containing a reference symbol (with positive or negative polarity) and a training symbol (with positive or negative polarity), i.e., a sub-sequence of four different symbols. In the preferred embodiment, the learning sequence descriptor is configured to specify the training symbol levels, a desired sign pattern associated with the learning signal symbols, and a training pattern associated with the arrangement of training symbols and reference symbols within each segment. Furthermore, if the sign pattern or training pattern is assumed to include a number of periodic sub-patterns, then a unique sequence can be specified with less information by indicating a period, the sign or training pattern within each period, and a number of repetitions of the period.

In one preferred exemplary embodiment, the learning sequence descriptor contains at least the following parameters:

N: the number of segments in the learning signal;

L: the symbol length of each segment;

SP: the sign pattern indicative of the polarity associated with individual symbols within each segment;

TP: the training pattern indicative of an ordering of a training symbol and a reference symbol within each segment; and TO: the training symbol order indicative of an assignment of different training symbols to the segments.

Figure 5:
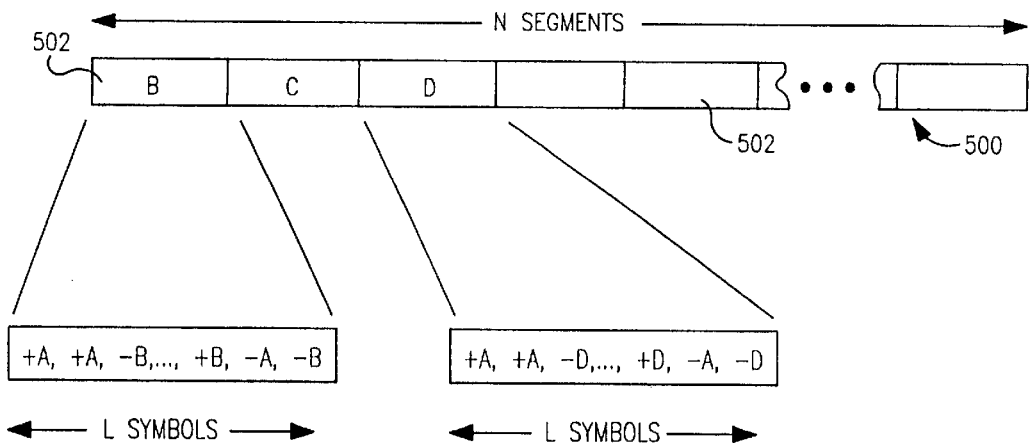
FIG. 5 depicts an exemplary learning signal format.

FIG. 5 is a schematic depiction of an exemplary learning signal 500 having N segments 502 with L symbols per segment. As shown, the first three segments 502 follow the training order BCD; the first segment 502 contains training symbols B and −B, the second segment 502 contains training symbols C and −C, and the third segment 502 contains training symbols D and −D. In the preferred embodiment, a single and unique training symbol is assigned to each segment, and each training symbol is associated with a signal point within the constellation employed by modem system 200, e.g., the μ-law constellation.

As described above in connection with synchronization signals, it may be desirable to shape the spectrum of the line impairment learning signal by restricting the possible learning signal patterns to those with little or no DC content, e.g., selecting SP and TP such that both the reference symbol and the training symbol have an approximately equal number of positive and negative occurrences. In addition, a given sub-pattern may be formed from a series of similar sequences, thus giving rise to less spectral content than a sub-pattern formed from a single, non-repeating sequence. Those skilled in the art should appreciate that the ranges of N and L may be suitably selected in accordance with the particular data communication environment or specific functional components within the operating environment. In one preferred exemplary embodiment, the value of N is within the range of 0 to 127 (or higher to accommodate larger signal point constellations or to enable the transmission of duplicate segments to maintain transmit power within a certain range), and the value of L is within the range of 0 to 256 (or higher in accordance with a given bit resolution). The descriptor contents for two exemplary learning signals are set forth below.

Example 1—N=4, L=12, SP=001100110011, TP=100100100100, TO=BC D E, where B, C, D, and E are 7-bit codes associated with μ-law signal points. An eighth bit may be used to designate the polarity of the current symbol. Denoting the reference symbol as A, the learning signal sequence would be as follows:

B, A, −A, −B, A, A, −B, −A, A, B, −A, −A C, A, −A, −C, A, A, −C, −A, A, C, −A, −A D, A, −A, −D, A, A, −D, −A, A, D, −A, −A E, A, −A, −E, A, A, −E, −A, A, E, −A, −A

Modem system 200 preferably utilizes reference symbols that are associated with the signal point constellation used by modem system 200, e.g., the μ-law constellation. As illustrated in this example, the reference symbol A is repeated throughout the learning signal. The reference symbols may be used in different ways. One preferred embodiment selects a particular signal point for use during initial equalizer training and generates an equalizer training signal using that signal point with pseudo-random polarity. During equalizer training, receiver 218 may arbitrarily assign a certain value to that signal point; the value assigned thus determines the overall gain of the equalizer. Any gain transformations in the channel will be absorbed by the equalizer. Absent impairments such as robbed-bit signaling (RBS), the selected value is a "correct" value by definition; received amplitudes of other transmit points are then received in proportion to the assigned value or "reference point".

If, for example, a second transmit point undergoes a gain transformation other than that of the reference point, the second transmit point will be received with a scaling proportional to the difference in gain transformation of the two signal points. Using this reference point as the reference symbol for digital impairment learning is especially advantageous when the receiver performs equalization with feedback. In that case, the feedback equalizer operates on estimated transmit symbols. Any error in the receiver's estimation will propagate through the feedback equalizer and cause further errors. However, if the reference point is known by definition, then there is no error associated with it. Thus, reference symbols fed back will reduce the amount of error propagation in the digital impairment learning procedure. For example, if the feedback filter delay line is seven symbols long, a suitable training pattern might only use the training symbol between seven reference symbols, completely avoiding error propagation. In practice, as the training symbols are learned more exactly, fewer reference symbols are needed between training points to avoid significant error propagation. In example 2 below, there are initially six reference symbols between training symbols, but as the receiver gains knowledge of the training symbols there are as few as two reference symbols between training symbols. In the case where RBS is present, significant deviations from the reference point in periodic symbols can be detected and dealt with separately (which is beyond the scope of this application). Alternatively, after a certain transmit symbol has been learned, it may be used as a reference symbol for later training symbols in the same manner.

Example 2—A more realistic example may use N=120 and L=132. SP may be chosen to be a sequence of 00110011 . . . , such that a 2 kHz tone is emulated, or as a random assignment of positive and negative signs. TP could be a 132-bit sequence designated as follows:

000000
100000
010000
001000
000100
000010
000001
000001
000010
000100
001000
010000
100010
001000
100001
000100
010001
000100
010010
001000
100000
000000

To decrease the amount of information needed to specify a particular learning signal, one or more of the above parameters can be fixed at both modem 202 and modem 204. For example, the length L could be fixed to any suitable number, e.g., 96, which allows for sub-patterns of periods 2, 3, 4, 6, 8, 12, 16, 24, 32, or 48. The length can also be variable, depending on the training symbol associated with the particular segment. For example, a first segment length may be associated with the smallest sixteen training symbol levels (i.e., the first μ-law or A-law code segment), a second length may be associated with the next sixteen levels (i.e., the second μ-law or A-law code segment), and so on. Thus, by specifying eight different lengths, symbols with smaller amplitudes can use longer segments and symbols with larger amplitudes shorter segments (because larger amplitudes are more easily distinguished as the distance between them increases).

Of course, the parameter N could also be predetermined to further reduce the amount of data needed to specify the learning signal. The present invention may alternatively specify learning signals on a more general basis, e.g., without reference to segments, particular symbol lengths, or the use of the same sign and training patterns within each segment. Indeed, any suitable manner of identifying a preferred learning signal format may be employed by the present invention. However, the preferred techniques described above may be desirable to conveniently and easily specify a learning signal.

Figure 6:
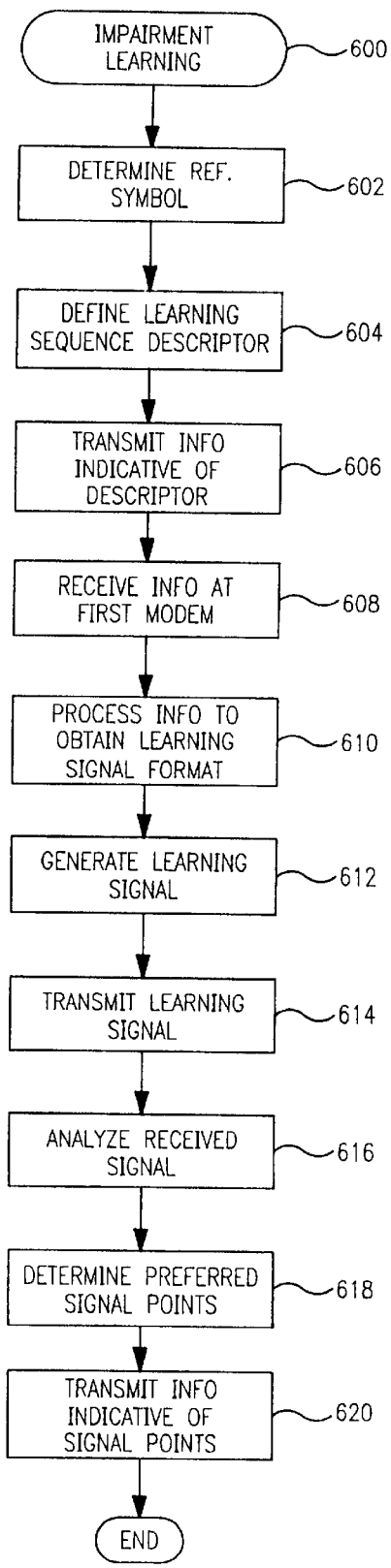
FIG. 6 is a flow diagram of an impairment learning process that may be performed by the modem system shown in FIG. 4.

Referring now to FIG. 6, an exemplary impairment learning process 600 may be performed by modem system 200 to determine digital impairments of channel 206 (see FIG. 4). It should be noted that process 600 may be performed during a start-up procedure associated with modem system 200. Process 600 may be performed in conjunction with any number of conventional data communication processes, and additional or alternative processing techniques may be suitably employed in a practical implementation. Furthermore, process 600 may be controlled by software instructions carried out by any number of microprocessors employed by modem system 200.

Impairment learning process 600 preferably begins with a task 602, during which modem 204 determines a suitable reference symbol for subsequent use during process 600. The determination of suitable reference symbols is described in detail above. Instead of determining the reference symbol during task 602, modem system 200 may be suitably configured to operate with one of any number of predetermined reference symbols. For example, modem system 200 may assume that one particular reference symbol is always used for impairment learning. Following task 602, a task 604 may be performed to suitably define at least one learning sequence descriptor (described above) that specifies a particular learning signal preferred by receiver 218 (see FIG. 4). Task 604 may be carried out automatically by modem 204 or in response to a remote programming routine configured to load the appropriate information into memory element 414. Alternatively, task 604 may be performed by memory element 414 and a corresponding processor element (not shown) of modem 204; in practice, the learning sequence descriptor may be defined by digital data stored in memory element 414. Task 604 preferably defines the parameters N, L, SP, TP, and TO described above. In addition, task 604 may define the value of the reference symbol A.

Following task 604, a task 606 causes modem 204 to transmit information indicative of a particular learning sequence descriptor to modem 202, preferably via transmitter 236. During a task 608, the transmitted information is received at modem 202. Following task 608, a task 610 may be performed to process the received information to obtain the learning sequence descriptor therefrom. Task 610 may employ any number of conventional signal processing techniques known to those skilled in the art.

A task 612 is performed to suitably generate a learning signal for transmission to modem 204; the learning signal is configured in accordance with the learning sequence descriptor. The particular learning signal may be generated by learning signal generator 402, which may include or access processor 416, a signal point table or other suitable memory element 418, a polarity assignment block 420, and an element 422 for assigning the reference symbol and training symbols to the particular segments in the learning signal (see FIG. 4). Following task 612, a specific learning signal, which is especially compatible with modem 204, is known at modem 202. A task 614 is then performed to transmit the formatted learning signal from modem 202 to modem 204, where it is eventually received.

In practice, the actual learning signal received by modem 204 will vary from the "ideal" signal transmitted by modem 202 (and known by modem 204 by virtue of the specified learning sequence descriptor). Accordingly, a task 616 may be performed by modem 204 to suitably analyze the received learning signal to determine the characteristics of channel 206, e.g., the digital line impairments. Task 616 may cause processor 406 to compare the received learning signal to a known learning signal associated with the current learning sequence descriptor and to determine the characteristics of channel 206 on a signal point basis.

In response to the analysis of the received learning signal, a task 618 preferably causes processor 406 to determine a number of preferred signal points for use by modem system 200 during data transmission. As described above in connection with FIG. 4, modem 204 may utilize signal point selector 410 to select preferred data points from a particular group of points, e.g., the μ-law constellation. Once a desired group of transmit signal points is selected by modem 204, a task 620 may be performed to cause modem 204 to suitably transmit information indicative of such signal points to modem 202. Following task 620, impairment learning process 600 ends. Modem 202 preferably receives and processes the preferred signal point information to obtain a preferred set of signal points for subsequent use in the data transmission mode.

In summary, the present invention provides an improved line impairment learning technique that is suitable for use in a remote data communication system such as a modem system. Such a modem system may utilize a programmable line impairment learning signal that is configured in accordance with design parameters of the receiver modem utilized by the system. The receiver modem may also be capable of requesting transmission of a specifically formatted learning signal that may be used to determine impairments of the communication channel. In addition, a PCM modem system may be configured to determine impairments of the communication channel in response to individual signal points and to select a particular constellation of such signal points for use during subsequent data transmission.

The present invention has been described above with reference to a preferred exemplary embodiments. However, it will be appreciated that changes and modifications may be made to the preferred embodiment without departing from the scope of the present invention. For example, the specific format and parameters used to define the synchronization signal and learning sequence descriptors may vary from application to application. In addition, the present invention may be suitably adapted for use in any number of different hardware environments. These and other changes or modifications are intended to be included within the scope of the present invention, as expressed in the following claims.

What is claimed is:

1. A method of communicating a learning sequence descriptor for use in constructing a learning sequence, said method comprising:

transmitting a first parameter specifying a number of segments in said learning sequence;

transmitting a second parameter specifying a sign pattern of each of said segments; and transmitting a third parameter specifying a training pattern of each of said segments, wherein said training pattern is indicative of an ordering of a reference symbol and a training symbol in each of said segments.

2. The method of claim 1 further comprising:

receiving said learning sequence constructed according to said parameters.

3. The method of claim 1 further comprising:

transmitting a fourth parameter specifying a length of each of said segments.

4. The method of claim 1 further comprising:

transmitting a fourth parameter specifying a training symbol order, wherein said training symbol is one of a plurality of training symbols, and wherein said training symbol order is indicative of an assignment of a different one of said plurality of said training symbols to each of said segments.

5. A method of communicating a learning sequence, said method comprising:

receiving a first parameter specifying a number of segments in said learning sequence;

receiving a second parameter specifying a sign pattern of each of said segments;

receiving a third parameter specifying a training pattern of each of said segments, wherein said training pattern is indicative of an ordering of a reference symbol and a training symbol in each of said segments;

constructing said learning sequence based on said parameters; and transmitting said learning sequence.

6. The method of claim 5 further comprising:

receiving a fourth parameter specifying a length of each of said segments.

7. The method of claim 5 further comprising:

receiving a fourth parameter specifying a training symbol order, wherein said training symbol is one of a plurality of training symbols, and wherein said training symbol order is indicative of an assignment of a different one of said plurality of said training symbols to each of said segments.

8. A data signal embodied in a carrier wave for communicating a learning sequence descriptor to a processor, said data signal comprising:

a first parameter specifying a number of segments in said learning sequence;

a second parameter specifying a sign pattern of each of said segments; and a third parameter specifying a training pattern of each of said segments, wherein said training pattern is indicative of an ordering of a reference symbol and a training symbol in each of said segments;

wherein said learning sequence descriptor communicated by said data signal is capable of use by said processor to construct a learning sequence.

9. The data signal of claim 8 further comprising:

a fourth parameter specifying a length of each of said segments.

10. The data signal of claim 8 further comprising:

a fourth parameter specifying a training symbol order, wherein said training symbol is one of a plurality of training symbols, and wherein said training symbol order is indicative of an assignment of a different one of said plurality of said training symbols to each of said segments.

11. A computer program product for communicating a learning sequence descriptor for use in constructing a learning sequence, said computer program product comprising:

code for transmitting a first parameter specifying a number of segments in said learning sequence;

code for transmitting a second parameter specifying a sign pattern of each of said segments; and code for transmitting a third parameter specifying a training pattern of each of said segments, wherein said training pattern is indicative of an ordering of a reference symbol and a training symbol in each of said segments.

12. The computer program product of claim 11 further comprising:

code for receiving said learning sequence constructed according to said parameters.

13. The computer program product of claim 11 further comprising:

code for transmitting a fourth parameter specifying a length of each of said segments.

14. The computer program product of claim 11 further comprising:

code for transmitting a fourth parameter specifying a training symbol order, wherein said training symbol is one of a plurality of training symbols, and wherein said training symbol order is indicative of an assignment of a different one of said plurality of said training symbols to each of said segments.

15. A computer program product for communicating a learning sequence, said computer program product comprising:

code for receiving a first parameter specifying a number of segments in said learning sequence;

code for receiving a second parameter specifying a sign pattern of each of said segments;

code for receiving a third parameter specifying a training pattern of each of said segments, wherein said training pattern is indicative of an ordering of a reference symbol and a training symbol in each of said segments;

code for constructing said learning sequence based on said parameters; and code for transmitting said learning sequence.

16. The computer program product of claim 15 further comprising:

code for receiving a fourth parameter specifying a length of each of said segments.

17. The computer program product of claim 15 further comprising:

code for receiving a fourth parameter specifying a training symbol order, wherein said training symbol is one of a plurality of training symbols, and wherein said training symbol order is indicative of an assignment of a different one of said plurality of said training symbols to each of said segments.

18. A communication device capable of communicating a learning sequence descriptor for use in constructing a learning sequence, said device comprising:

a transmitter; and a processor in communication with said transmitter;

wherein said processor is capable of providing a first parameter, a second parameter and a third parameter to said transmitter capable of transmitting said parameters, wherein said first parameter specifies a number of segments in said learning sequence, said second parameter specifies a sign pattern of each of said segments, and said third parameter specifies a training pattern of each of said segments, wherein said training pattern is indicative of an ordering of a reference symbol and a training symbol in each of said segments.

19. The device of claim 18 further comprising:

a receiver in communication with said processor, wherein said receiver is capable of receiving said learning sequence constructed according to said parameters.

20. The device of claim 18, wherein said processor is further capable of providing a fourth parameter to said transmitter capable of transmitting said fourth parameter, wherein said fourth parameter specifies a length of each of said segments.

21. The device of claim 18, wherein said processor is further capable of providing a fourth parameter to said transmitter capable of transmitting said fourth parameter, wherein said fourth parameter specifies a training symbol order, wherein said training symbol is one of a plurality of training symbols, and wherein said training symbol order is indicative of an assignment of a different one of said plurality of said training symbols to each of said segments.

22. A communication device capable of communicating a learning sequence, said device comprising:

a processor;

a receiver in communication with said processor, said receiver capable of receiving a first parameter, a second parameter and a third parameter and providing said parameters to said processor, wherein said first parameter specifies a number of segments in said learning sequence, said second parameter specifies a sign pattern of each of said segments, and said third parameter specifies a training pattern of each of said segments, wherein said training pattern is indicative of an ordering of a reference symbol and a training symbol in each of said segments; and a transmitter in communication with said processor;

wherein said processor constructs said learning sequence based on said parameters and provides said learning sequence to said transmitter capable of transmitting said learning sequence.

23. The device of claim 22, wherein said receiver is further capable of receiving a fourth parameter specifying a length of each of said segments.

24. The device of claim 22, wherein said receiver is further capable of receiving a fourth parameter specifying a training symbol order, wherein said training symbol is one of a plurality of training symbols, and wherein said training symbol order is indicative of an assignment of a different one of said plurality of said training symbols to each of said segments.

* * * * *